United States Patent
Max et al.

(10) Patent No.: US 10,846,428 B2
(45) Date of Patent: Nov. 24, 2020

(54) METHOD, APPARATUS AND COMPUTER READABLE STORAGE MEDIUM HAVING INSTRUCTIONS FOR PROCESSING DATA COLLECTED BY A MOTOR VEHICLE

(71) Applicant: VOLKSWAGEN AG, Wolfsburg (DE)

(72) Inventors: Stephan Max, Gifhorn (DE); Toralf Hessel, Berlin (DE)

(73) Assignee: Volkswagen AG, Wolfsburg (DE)

( * ) Notice: Subject to any disclaimer, the term of this patent is extended or adjusted under 35 U.S.C. 154(b) by 177 days.

(21) Appl. No.: 15/843,222

(22) Filed: Dec. 15, 2017

(65) Prior Publication Data
US 2018/0173895 A1    Jun. 21, 2018

(30) Foreign Application Priority Data

Dec. 16, 2016  (DE) .................. 10 2016 225 287

(51) Int. Cl.
*G06F 21/62*     (2013.01)
*G07C 5/08*      (2006.01)

(52) U.S. Cl.
CPC ......... *G06F 21/6254* (2013.01); *G07C 5/085* (2013.01); *G06F 2221/2111* (2013.01)

(58) Field of Classification Search
CPC ......... G06F 21/6254; G06F 2221/2111; G07C 5/085
See application file for complete search history.

(56) References Cited

U.S. PATENT DOCUMENTS 6,236,337 B1 *  5/2001  Beier ............... H04B 7/26
                                                340/426.16
6,650,252 B2 * 11/2003  Miller, Jr. ........ G01C 21/26
                                                340/988

(Continued)

FOREIGN PATENT DOCUMENTS

CN      101128051 A     2/2008
CN      105874483 A     8/2016

(Continued)

OTHER PUBLICATIONS

Gruteser et al., Anonymous usage of location-based services through spatial and temporal cloaking, Conference on Mobile Systems, Applications and Services, May 5-8, 2003, pp. 31-42.

(Continued)

*Primary Examiner* — Saleh Najjar
*Assistant Examiner* — Devin E Almeida
(74) *Attorney, Agent, or Firm* — Barnes & Thornburg LLP

(57) ABSTRACT

A method, an apparatus and a computer-readable storage medium having instructions for processing data captured by a motor vehicle. In a first operation, a datum captured by a motor vehicle is received. Subsequently, location-oriented or time-oriented masking is applied to the received datum. Alternatively or additionally, the received datum is separated from other data captured by the motor vehicle. The masked or separated datum is forwarded for evaluation. The location-oriented or time-oriented masking or the separating of the received datum from other data captured by the motor vehicle is effected inside the motor vehicle or in a reception system with a connection to the motor vehicle.

18 Claims, 4 Drawing Sheets

(56) References Cited

U.S. PATENT DOCUMENTS

| | | | | |
|---|---|---|---|---|
| 7,818,114 B2* | 10/2010 | Jacobson | ............... | G08G 1/052 |
| | | | | 701/117 |
| 7,818,144 B2* | 10/2010 | Delargy | ................... | G07C 1/12 |
| | | | | 702/177 |
| 9,203,843 B2* | 12/2015 | Arasavelli | ................ | H04B 7/26 |
| 2003/0158960 A1 | 8/2003 | Engberg | | |
| 2009/0143966 A1* | 6/2009 | Jacobson | ............. | G08G 1/0104 |
| | | | | 701/118 |
| 2012/0030133 A1* | 2/2012 | Rademaker | ............ | G06Q 10/08 |
| | | | | 705/333 |
| 2013/0117857 A1* | 5/2013 | Zimmermann | ..... | G06F 21/6218 |
| | | | | 726/27 |
| 2014/0136094 A1* | 5/2014 | Yasuda | .................. | G08G 1/166 |
| | | | | 701/300 |
| 2015/0154404 A1 | 6/2015 | Patel et al. | | |
| 2015/0154559 A1* | 6/2015 | Barbush | ........... | G06Q 10/08355 |
| | | | | 705/338 |
| 2015/0279216 A1* | 10/2015 | Ghanma | ................ | G08G 1/202 |
| | | | | 705/7.15 |
| 2016/0044449 A1 | 2/2016 | Branson et al. | | |
| 2016/0258774 A1 | 9/2016 | Santilli et al. | | |
| 2017/0161973 A1* | 6/2017 | Katta | ..................... | G06Q 40/08 |
| 2017/0337510 A1 | 11/2017 | Shroff et al. | | |
| 2017/0337511 A1* | 11/2017 | Shroff | ................ | G06Q 10/0832 |
| 2018/0173895 A1 | 6/2018 | Max et al. | | |
| 2018/0342156 A1* | 11/2018 | Martin | ................... | G01H 9/004 |

FOREIGN PATENT DOCUMENTS

| | | |
|---|---|---|
| CN | 108205307 A | 6/2018 |
| DE | 102011106295 A1 | 1/2012 |
| DE | 102011113051 A1 | 3/2012 |
| DE | 102015111671 A1 | 1/2016 |
| DE | 102016200855 B3 | 9/2016 |
| EP | 2159122 A2 | 3/2010 |
| EP | 2983381 A1 | 2/2016 |
| WO | 2015100278 A1 | 7/2015 |

OTHER PUBLICATIONS

Office Action for Chinese Patent Application No. 201711364097.4; dated Jan. 9, 2020.

* cited by examiner

METHOD, APPARATUS AND COMPUTER READABLE STORAGE MEDIUM HAVING INSTRUCTIONS FOR PROCESSING DATA COLLECTED BY A MOTOR VEHICLE

PRIORITY CLAIM

This patent application claims priority to German Patent Application No. 10 2016 225 287.9, filed 16 Dec. 2016, the disclosure of which is incorporated herein by reference in its entirety.

SUMMARY

Illustrative embodiments relate to a method, an apparatus and a computer-readable storage medium having instructions for processing data captured by a motor vehicle. Illustrative embodiments relate to a method, an apparatus and a computer-readable storage medium having instructions for processing data captured by a motor vehicle that ensure anonymization of customer data.

BRIEF DESCRIPTION OF THE DRAWINGS

Disclosed embodiments are described in the appended claims in conjunction with the figures.

DETAILED DESCRIPTION

Figure 1:
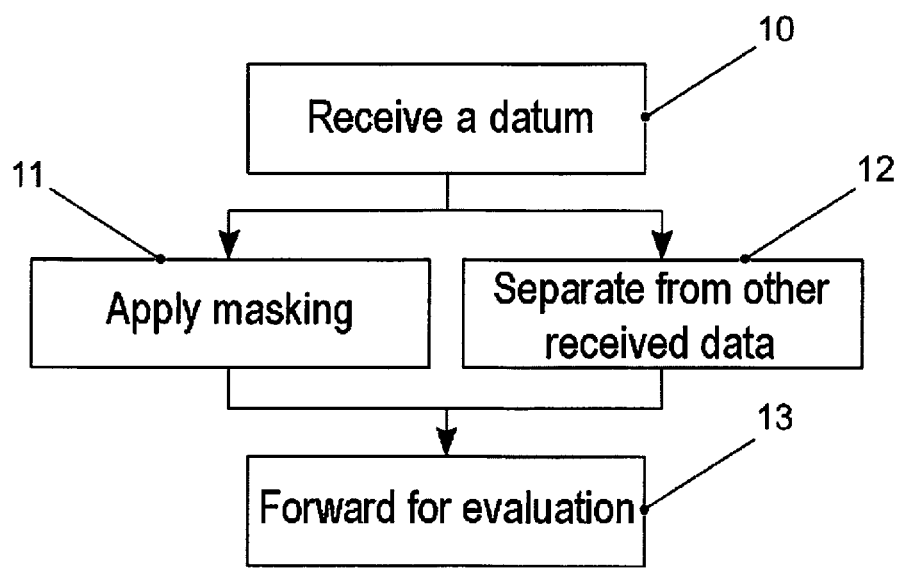
FIG. 1 schematically shows a method for processing data captured by a motor vehicle.

In modern motor vehicles, a wide variety of data are collected. These data sometimes allow inference of personal or material circumstances of a particular or at least determinable natural person, for example, about the driver of the motor vehicle. As vehicle networking increases, there is an interest in the data captured by the vehicle being used for further evaluation, e.g., for capturing traffic data or weather data.

Such collection and use of the data is, on the basis of the respective data protection laws that apply, normally possible only with a declaration of consent from the driver. Although users today, particularly in the area of software, are entirely familiar with accepting conditions of use and granting approval for data evaluation, this has not been customary in the automotive field to date. Obtaining a declaration of consent for use of the data is therefore not always simple. In addition, software updates may require a new declaration of consent to be obtained from the user, which can be a nuisance to the user in the long run.

Against this background, the document US 2013/0117857 A1 describes a method for processing data in controllers of a vehicle. The communication of the vehicle with a backend system involves user-specific data being interchanged that allow inference of the person of the user or the behavior thereof or the habits thereof. To protect against misuse, these data are anonymized. Additionally, a data protection mode is activeable for the controllers by a user of the vehicle. When the data protection mode has been activated, transmission of predetermined data from the vehicle is prevented or is permitted exclusively after input of confirmation requested from the user of the vehicle. The method described is used to provide the user with the opportunity to prevent the forwarding of particular data. However, this does not alter the fact that collection of the data that are not affected by this exclusion requires a declaration of consent to be obtained from the user.

Disclosed embodiments provide solutions that allow data captured by a motor vehicle to be processed without requiring consent from the user.

This is achieved by a method, by an apparatus, and by a computer-readable storage medium.

According to a first disclosed embodiment, a method for processing data captured by a motor vehicle comprises the operations of:

receiving a datum captured by a motor vehicle;

applying location-oriented or time-oriented masking to the received datum or separating the received datum from other data captured by the motor vehicle; and forwarding the masked or separated datum for evaluation.

According to another disclosed embodiment, an apparatus for processing data captured by a motor vehicle has:

an input for receiving a datum captured by the motor vehicle;

a data masking unit for applying location-oriented or time-oriented masking to the received datum or a data separation unit for separating the received datum from other data received from the motor vehicle; and an output for forwarding the masked or separated datum for evaluation.

According to a further disclosed embodiment, a computer-readable storage medium contains instructions that, when executed by a computer, prompt the computer to carry out the following operations for processing data captured by a motor vehicle:

receiving a datum captured by a motor vehicle;

applying location-oriented or time-oriented masking to the received datum or separating the received datum from other data captured by the motor vehicle; and forwarding the masked or separated datum for evaluation.

The disclosed solution allows anonymization of the customer data in so far as there is no further personal link and the data can be collected without consent from the customer. This involves the use of essentially three approaches, location-oriented masking, time-oriented masking and content-oriented focusing. Location-oriented masking involves the data being masked in respect of the location of their capture. Accordingly, the data are masked in respect of the time of capture in the case of time-oriented masking. Content-oriented focusing involves the received datum being separated from other data captured by the motor vehicle. The location-oriented or time-oriented masking or the separating of the received datum from other data captured by the motor vehicle can be effected inside the motor vehicle or in a reception system with a connection to the motor vehicle. The location-oriented masking and the time-oriented masking achieve group anonymity. This can be understood to mean that the captured data can now be assigned only to a sufficiently large group of vehicles and no longer to a single vehicle or a few vehicles. It is therefore no longer possible, or possible only with a disproportionately large amount of effort, to take the data as a basis for inferring personal data. In the case of the content-oriented focusing, there is the opportunity for a piece of information to be delivered very selectively. Although the data are then output with a very high level of precision in respect of position and time, these data are deliberately separated from all other data by channel separation. The effect achieved by this is that no personal link can be made.

According to at least one disclosed embodiment, the degree of location-oriented or time-oriented masking is increased for a personal link of the received datum. This ensures that critical data, i.e., data with a high degree of personal link, are subject to greater masking than less critical data. To determine whether data are critical, it is possible to take into consideration how many data are required for inference of the person, for example. Data that are captured on the premises of the driver allow inference of the driver extremely easily, for example, whereas this is not the case with data that are captured on the freeway.

According to at least one disclosed embodiment, the location-oriented or time-oriented masking is dependent on the flow of traffic relevant to the location or time of capture of the datum by the motor vehicle. By way of example, the degree of location-oriented or time-oriented masking is decreased for the flow of traffic relevant to the location or time of capture of the datum by the motor vehicle. The aim of the masking is group anonymity. This aim can be achieved with just little masking when there is a large flow of traffic. When there is a small flow of traffic, on the other hand, a great deal of masking makes sense to effectively preclude a personal link. By way of example, a measured value is normally captured by a multiplicity of vehicles in a short time on a freeway during the day. In this case, slight masking is adequate. At night on a back road with little use, a measured value is sometimes captured only by a single vehicle. In this case, extensive masking is appropriate. The flow of traffic can be determined by an onboard sensor system of the motor vehicle. Alternatively or additionally, data pertaining to the flow of traffic can be provided by a server.

According to at least one disclosed embodiment, the location-oriented masking is effected by assigning the received datum to a raster. The data can be integrated into a km raster, for example, without the value of the data being reduced excessively. Nevertheless, it is thus no longer possible to take the data as a basis for inferring personal data.

According to at least one disclosed embodiment, the time-oriented masking is effected by virtue of a random shift in the measurement time of the received datum. In the simplest case, the measurement times can be evenly distributed over the time of the shift. Of benefit, however, is the use of an asymmetric distribution function, for example, a Pareto distribution. Safe inference of the vehicle is thus not possible, but at the same time the shift in the data is only very small on average. Nevertheless, a very large shift in the data is fundamentally possible, which means that it is not possible for statements to be made with a high level of certainty in regard to a particular vehicle, i.e., statements that the originator of a datum has a high probability of being a particular vehicle.

According to at least one disclosed embodiment, after the received datum has been separated from other data captured by the motor vehicle, no further captured data are transmitted by this motor vehicle for a period of time. In this manner, possible cross-correlations are reliably precluded.

According to at least one disclosed embodiment, a position of a motor vehicle is received and compared with orders in an order memory. If the position of the motor vehicle fits an order in the order memory, a datum is requested from the motor vehicle. In this manner, it is possible for data to be requested specifically from vehicles that are at positions for which data are still required. At the same time, it is thus possible for the repeated transmission of the same information to be limited. By way of example, there is little benefit if a recognized road sign is transmitted by a multiplicity of vehicles. The specific requesting of data therefore allows the accumulating volume of data to be kept within meaningful limits.

Optionally, a disclosed method or a disclosed apparatus is used in an autonomously or manually controlled vehicle, particularly a motor vehicle.

To provide a better understanding of the principles of the present disclosure, embodiments are explained in more detail below on the basis of the figures. It goes without saying that the disclosure is not restricted to these embodiments and that the features described can also be combined or modified without departing from the scope of protection of the disclosure, as defined in the appended claims.

FIG. 1 schematically shows a method for processing data captured by a motor vehicle. In a first operation, a datum captured by a motor vehicle is received 10. Subsequently, location-oriented or time-oriented masking 11 is applied to the received datum. Alternatively or additionally, the received datum is separated from other data captured by the motor vehicle 12. The masked or separated datum is finally forwarded for evaluation 13. The location-oriented or time-oriented masking 11 or the separating 12 of the received datum from other data captured by the motor vehicle can be effected inside the motor vehicle or in a reception system with a connection to the motor vehicle.

Figure 2:
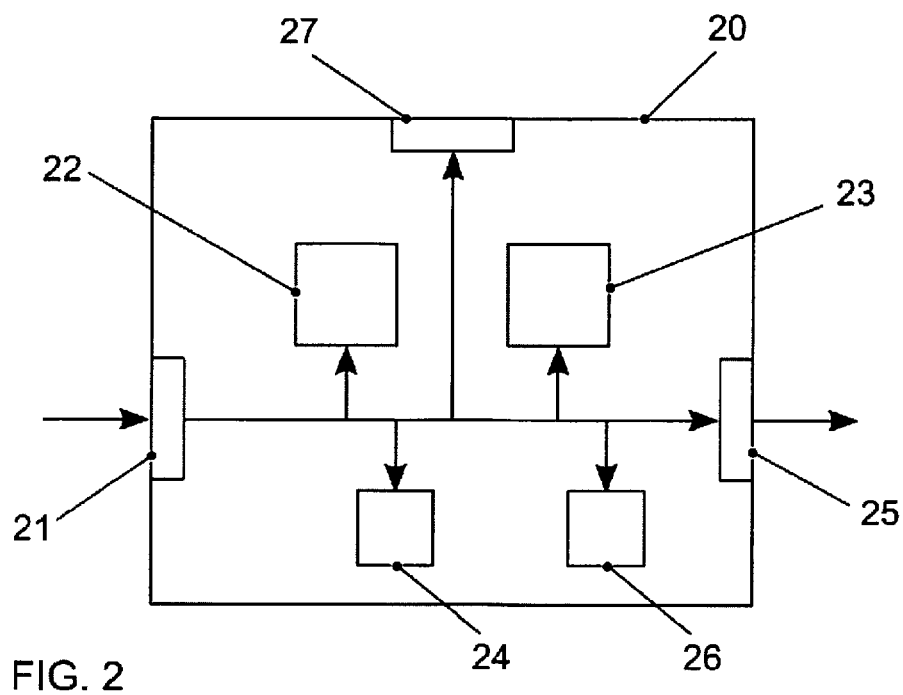
FIG. 2 shows a first embodiment of an apparatus for processing data captured by a motor vehicle.

FIG. 2 shows a simplified schematic depiction of a first embodiment of an apparatus 20 for processing data captured by a motor vehicle. The apparatus 20 has an input 21 for receiving a datum captured by the motor vehicle. A data masking unit 22 applies location-oriented or time-oriented masking to the received datum. Alternatively or additionally, the apparatus 20 has a data separation unit 23 for separating the received datum from other data received from the motor vehicle. The parameters necessary for the location-oriented or time-oriented masking are determined and provided by a data processing unit 24. The masked or separated datum is finally forwarded via an output 25 for evaluation. A user interface 27 can be used to change settings of the data masking unit 22, the data separation unit 23 or the data processing unit 24 if need be. The data accumulating in the apparatus 20 can moreover be stored in a memory 26 of the apparatus 20, for example, for later evaluation. The input 21 and the output 25 may be implemented as separate interfaces or as a combined bidirectional interface. The data masking unit 22, the data separation unit 23 and the data processing unit 24 may be realized as dedicated hardware, for example, as integrated circuits. Naturally, they can also be partially or completely combined or implemented as software that runs on a suitable processor, however.

Figure 3:
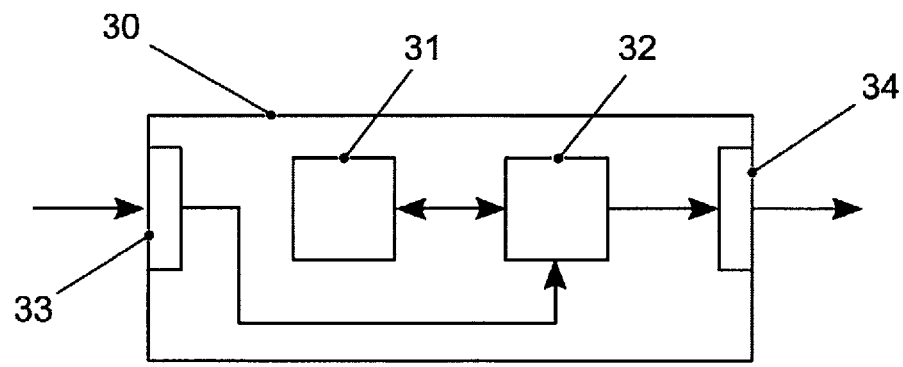
FIG. 3 shows a second embodiment of an apparatus for processing data captured by a motor vehicle.

FIG. 3 shows a simplified schematic depiction of a second embodiment of an apparatus 30 for processing data captured by a motor vehicle. The apparatus 30 has a processor 32 and a memory 31. By way of example, the apparatus 30 is a computer, a workstation or a controller. The memory 31 stores instructions that prompt the apparatus 30, when executed by the processor 32, to carry out the operations according to one of the methods described. The instructions stored in the memory 31 therefore embody a program that is executable by the processor 32 and that realizes the disclosed method. The apparatus has an input 33 for receiving information. Data generated by the processor 32 are provided via an output 34. Furthermore, they can be stored in the memory 31. The input 33 and the output 34 may be combined to form a bidirectional interface.

The processor 32 can comprise one or more processing units, for example, microprocessors, digital signal processors or combinations thereof.

The memories 26, 31 of the embodiments described may have both volatile and nonvolatile memory areas and can comprise a wide variety of memory devise and storage media, for example, hard disks, optical storage media or semiconductor memories.

The two disclosed embodiments of the apparatus may be integrated in the motor vehicle or may be part of a reception system with a connection to the motor vehicle.

Figure 4:
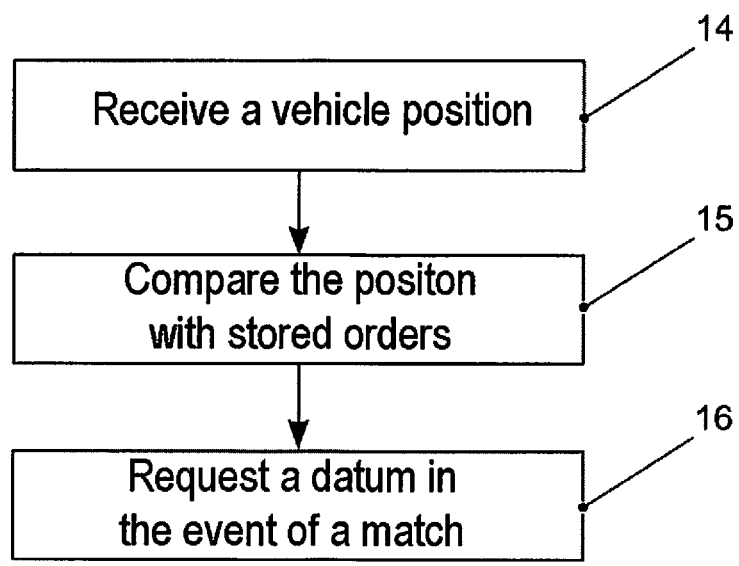
FIG. 4 schematically depicts a method for requesting a datum from a vehicle.

FIG. 4 schematically depicts a method for requesting a datum from a vehicle. After a position of a motor vehicle has been received 14, this position is compared 15 with orders in an order memory. The order memory 44 contains all the active commissioned measurement orders for defined positions. If the position of the motor vehicle fits an order in the order memory, a datum is requested 16 from the motor vehicle.

Figure 7:
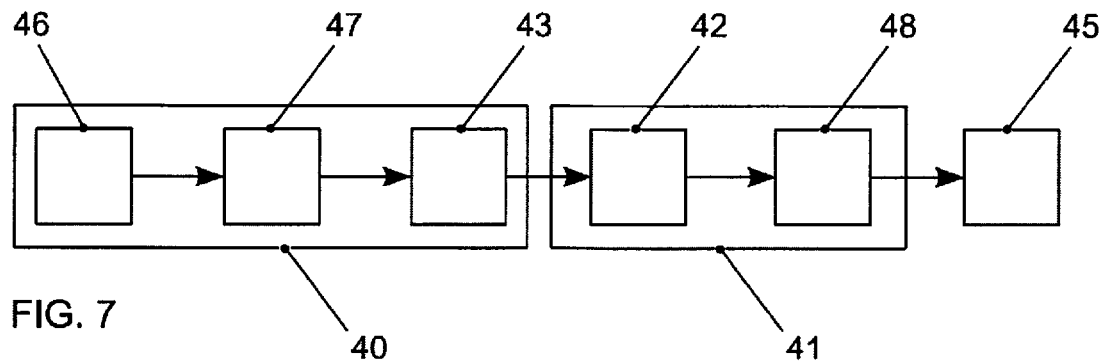
FIG. 7 shows a system for transmitting data from a vehicle to a backend, in which anonymization is effected in the vehicle and FIG. 8 schematically shows a sequence of the anonymization of the data in the vehicle.
Figure 8:
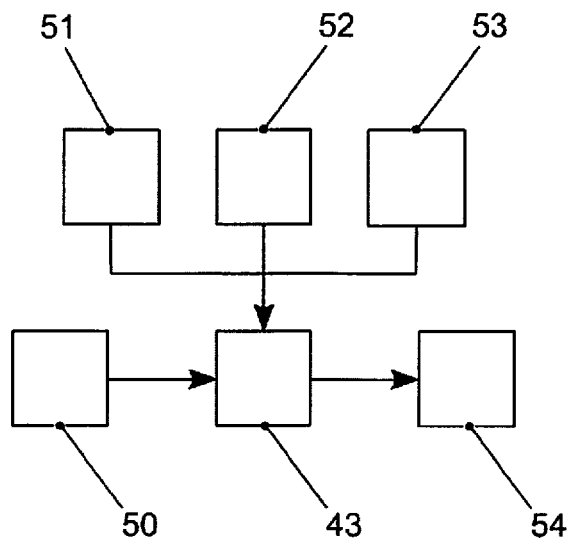

A disclosed embodiment will be described below of the basis of FIG. 5 to FIG. 8. In this case, in FIG. 5 and FIG. 6, the data are anonymized in the backend. In FIG. 7 and FIG. 8, the data are anonymized in the vehicle itself.

Figure 5:
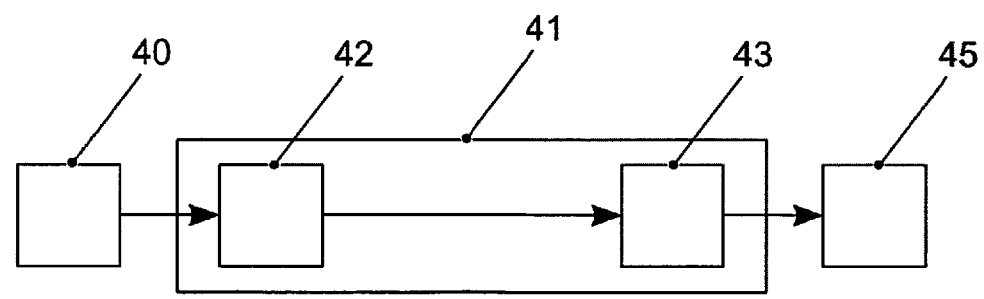
FIG. 5 schematically shows a first mechanism for transmitting data from a vehicle to a backend, in which anonymization is effected in the backend.

FIG. 5 shows a first mechanism for transmitting data from a vehicle 40 to a backend 45, for example, for computer-aided evaluation. This is a "push mechanism", in which the vehicle 40 transmits data to the backend 45 on its own initiative.

A second mechanism for transmitting data from a vehicle 40 to a backend 45 is depicted in FIG. 5. This is a "pull mechanism". In this case, the backend 45 requests data from the vehicle 40, which data are only then transmitted from the vehicle 40 to the backend 45.

It holds for both cases that the vehicle 40 is capable of collecting data and of sending them to a reception system 41. This is done either autonomously or on the basis of a request. A pseudonymization unit 42 of the reception system 41 performs pseudonymization of the received data. In this case, pseudonymizing denotes replacing identification features with an identifier for the purpose of precluding or substantially hampering the determination of the affected party. By way of example, an identification number transmitted by the vehicle 40 is replaced with a pseudonymized identification number to preclude determination of the vehicle 40.

An anonymization unit 43 of the reception system 41 anonymizes the transmitted data of the vehicle 40. In this case, anonymizing denotes altering the data such that it is no longer possible, or is possible only with a disproportionately large amount of effort in terms of time, cost and manpower, for the individual data to be assigned to a particular or determinable vehicle and therefore to a particular or determinable natural person. For this purpose, the anonymization unit 43 employs the mechanisms described later on, which can also be combined, depending on the class of the transmitted data.

The backend 45 describes the data-using unit. This is where the data are processed. Any reception of data with a personal user content within the data is no longer admissible at this location.

Figure 6:
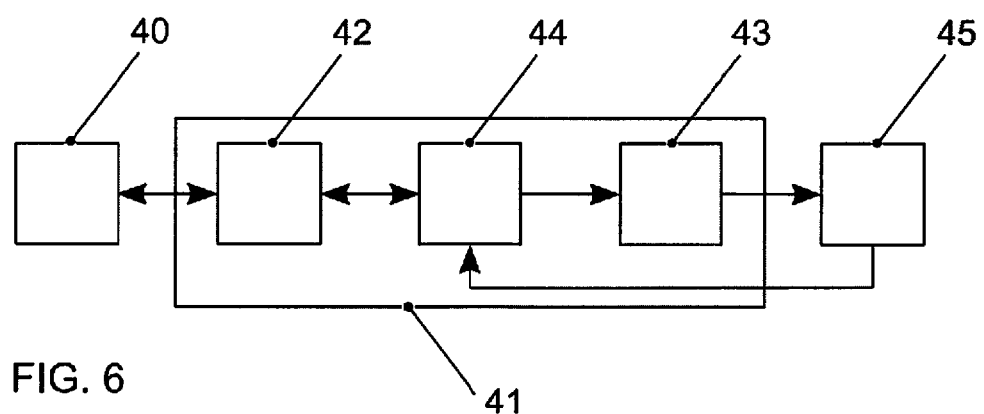
FIG. 6 schematically shows a second mechanism for transmitting data from a vehicle to a backend, in which anonymization is effected in the backend.

The system depicted in FIG. 6 additionally has an order memory 44. The order memory 44 contains all the active measurement orders commissioned by the backend for defined positions. The vehicle 40 can report to the order memory 44 with its ego position via the pseudonymization unit 42. The order memory 44 then checks whether the ego position fits an open measurement order. If this is the case, the order memory 44 requests the measurement data from the vehicle 40 via the pseudonymization unit 42. The measurement data are then transmitted from the vehicle 40 to the reception system 41 in return.

To anonymize the data, the anonymization unit 43 provides three different methods that are employed depending on the class of the transmitted data and can also be combined.

A first method consists in location-oriented masking of the data, i.e., the data are masked in respect of the location of their capture. Examples of data that are masked in this manner are rain and weather data that can be captured, e.g., for a weather service. Such data can be integrated into a km raster, for example, without the value of the data being reduced excessively. Nevertheless, it is thus no longer possible to take the data as a basis for inferring personal data.

A second method consists in time-oriented masking of the data, i.e., the data are masked in respect of the time of capture. Examples of data that are masked in this manner are data from recognized signs. These data are constant as seen over time, which means that a shift in the time of capture within the framework of 0-24 hours, for example, reduces the value of the data only to a limited degree. At the same time, it becomes practically impossible to infer the driver.

Optionally, the shift in the time is subject to a random distribution. In the simplest case, the measurement times can be evenly distributed over the time of the shift. Of benefit, however, is the use of an asymmetric distribution function, for example, a Pareto distribution. Safe inference of the driver is thus not possible, but at the same time the shift in the data is only very small on average. It is thus possible to determine, for example, with a high degree of probability, that a vehicle was at a particular location at a particular time, but there remains an uncertainty factor, since this very vehicle could have had a large shift effected.

The aim of the time-oriented and location-oriented masking is to achieve group anonymity. This is intended to be understood to mean that the captured data can now be assigned only to a sufficiently large group of vehicles, and no longer to a single vehicle or a few vehicles. In this case, it may be relevant where and when the data are captured. On a freeway during the day, a measured value is normally captured by a multiplicity of vehicles in a short time. In this case, slight masking is adequate. At night on a back road with little use, a measured value is sometimes captured only by a single vehicle. In this case, extensive masking is required. This circumstance can be taken into account by the anonymization unit 43 by taking into consideration data pertaining to the flow of traffic.

A third method consists in content-oriented focusing. In this case, there is the opportunity to deliver a piece of information very selectively. In this case, although the data are output with a very high degree of precision in respect of position and time, these data are deliberately separated from all other data by channel separation. The effect achieved by this is that no personal link can be made. A further opportunity is for the vehicle to prevent any communication for a certain time after the "focused supply of data". In this manner, possible cross-correlations are reliably precluded.

Examples of data that are open to content-oriented focusing are hazard locations, variable message signs or traffic light sequences. Such data are practically useless without sufficiently accurate location and time information. Moreover, in the case of hazard locations, for example, accidents or when it has been identified that a driver is traveling the wrong way along a freeway, it may be appropriate to give priority over data protection to the use of the data for preventing accidents. Data pertaining to the fuel tank level can also be dealt with in this manner. Such data are useful for determining consumption information related to practice, for example. This allows, e.g., the effects of changes in the engine control to be evaluated. Since no useful consumption information can be ascertained without location and time information, location-oriented or time-oriented masking of the data is out of the question.

FIG. 7 shows a system for transmitting data from a vehicle 40 to a backend 45 in which anonymization is effected in the vehicle 40. In this case, an ambient sensor system of the vehicle 40 is used to estimate the flow of traffic. From this, the required time-oriented or space-oriented shift is ascertained to mask the identity of the vehicle 40 in a defined anonymization group. An anonymization group is intended to be understood to mean the group in which an individual remains anonymous, i.e., is not a recognizable part of the group, despite his actions. After transmission of the data to a reception system 41, the IDs of the vehicle on all communication layers are removed by a pseudonymization unit 42 in the reception system 41. In detail, this approach is based on the sequence described below. All the vehicle sensors 46, such as, e.g., camera, radar, ultrasonic, temperature or climate sensors, report the measured data to a communication unit 47. This is where the data are provided with a time stamp and a location stamp, unless this has already been done by the sensors. An anonymization unit 43 takes these data and alters the time stamp or location stamp to the extent that the identity of the vehicle 40 in a group of vehicles is adequately concealed. The operation of the anonymization unit 43 is described later on the basis of FIG. 8. The anonymized data, which also have vehicle-specific mobile-radio-based connection data, are sent by mobile radio to the reception system 41, in which a pseudonymization unit 42 isolates the data from the vehicle-specific connection data and provides them with a pseudo-ID. In this case, the vehicle 40 is registered by a group certificate, which is identical in all vehicles. The aim in this case is to hamper upload for unauthorized parties without revealing the ID of the vehicle 40. The data are then adapted to suit the interface of the backend 45 by a data adaptation unit 48 and are sent accordingly. The user of the data then evaluates the captured customer data in accordance with his analysis aim. In FIG. 7, the pseudonymization unit 42 is part of a reception system 41 provided by the vehicle manufacturer. The pseudonymization unit 42 can alternatively be provided by an external service provider. Accordingly, the user of the data may be the vehicle manufacturer or a company that is independent thereof.

FIG. 8 schematically shows a sequence of the anonymization of the data in the vehicle. The input used for the anonymization unit 43 is the personalized data 50. Moreover, anonymization parameters 51 are provided, particularly the required magnitude of the anonymization group and the degrees of freedom of the incoming data records for the shift in the time stamp and location stamp. From the data 52 pertaining to detected vehicles in the surroundings, a traffic flow forecast in the surroundings of the vehicle is calculated. If required, additional marginal parameters 53 for the data can be taken into consideration. By way of example, it is possible to stipulate that no transmission of data pertaining to the last 100 m of the vehicle movement is effected, so as to protect the position of the residence of the driver. Based on the input variables, the anonymization unit 43 then shifts the data in accordance with the time stamp or the location stamp. In the event of a shift in the time stamp, the time interval needed and the possible distribution are first of all computed on the basis of the parameters. Thereafter, the shift to the measurement time is computed by a random algorithm and added to the measurement data. In the event of a shift in the location stamp, the shift interval needed and the possible distribution are first of all determined from the parameters. Thereafter, the shift on the location stamp is computed by a random algorithm and added to the measurement data. What is important in this case is that the shift can be implemented only along the route already traveled. To this end, the last GPS measurements from, e.g., the last 5 km, may be stored. The data are then shifted only along these stored positions. Without this limitation, the shift can be at least partially corrected in the event of a free shift by "map matching" algorithms. The anonymized data 54 are finally output by the anonymization unit 43 for the further processing.

In the case of the anonymization in the vehicle too, an optimized random distribution for the shift in the data can be used, for example, the Pareto distribution already mentioned above. In this case, the data can be shifted such that the shift is small on average, but has a very high maximum. In this manner, on the one hand, the quality of most data is corrupted only to a small degree, whereas, on the other hand, safe identification is possible only within a large anonymization group as a result of the large maximum shift.

Regardless of whether the anonymization is effected in the vehicle or in the backend, the implementation of the anonymization is dependent on the type of the data themselves or on the degrees of freedom thereof. The aim in this case must be not to devalue the data as a result of the anonymization. To this end, the data can be classified as described below, for example.

The first criterion that should be distinguished is how transient the information itself is. Multiple groups can be formed in this regard:

| Transience | Benefit to other road users | Examples of data |
| --- | --- | --- |
| <1 sec | Use for driver assistance systems, directly engaging systems | Braking and acceleration processes, driving maneuvers by vehicles, traffic |
| <1 min | Useable for direct maneuver planning (next 10 sec) | Traffic light states, variable message signs, occupancy of parking spaces |

-continued

| Transience | Benefit to other road users | Examples of data |
| --- | --- | --- |
| <10 min | Useable for indirect maneuver planning (general conditioning for the journey), route planning | Traffic flow states, local hazard locations, paths of movement of the vehicles, weather, road condition, climate, light |
| <1 h | Useable for indirect maneuver planning (general conditioning for the journey), route planning, self-location of the vehicle on the basis of identified map features | Static signs, road markings, |
| >1 h | Useable for route planning, self-location of the vehicle on the basis of identified map features | Road profiles, road names |

The second criterion, defined in the table below, is the reaction time in the receiving vehicle that is admissible for the processing of a new piece of information.

| Reaction time | Customer function | User data of the function |
| --- | --- | --- |
| <1 sec | Driver assistance systems, directly engaging systems | Braking and acceleration processes, driving maneuvers of vehicles, traffic, local hazard locations |
| <1 min | Direct maneuver planning (next 10 sec) | Traffic light states, variable message signs, occupancy of parking spaces, local hazard locations, road condition, paths of movement for the vehicles within the lane |
| <10 min | Indirect maneuver planning (general conditioning during the journey) | Traffic flow states, weather, climate, light, |
| <1 h | Route planning | Road profiles, road names, traffic flow states |
| >1 h | Self-location of the vehicle on the basis of identified map features | Static signs, road markings, road profiles |

A shift in the measurement time of the data to conceal the identity of the vehicle within a group is now assumed. In this case, it is necessary to mask the identity of the vehicle position, but without devaluing the data. To achieve this aim, it is possible for an exponential distribution with the following divisional classes to be used, for example. In this case, K denotes the group size of the anonymization group for the 95% distribution.

| Groups $G_x$ | Group size $a(G_x, K)$ | Probability $P(G_x)$ |
| --- | --- | --- |
| 1 | K | 95% |
| 2 | K * 10 | 2.5% |
| 3 | K * $10^2$ | 1.25% |
| 4 | K * $10^3$ | 0.625% |
| 5 | K * $10^4$ | 0.3125% |
| 6 | Infinite (suppression of the report) | 0.3125% |

The assignment of the data to a 95% group size is described in the table below.

| Data | Transience | Criticality | 95% group size |
| --- | --- | --- | --- |
| Local hazard locations | <10 min | <1 sec | K = 2 |
| Traffic light states, variable message signs | <1 min | <1 min | K = 2 |
| Occupancy of parking spaces | <1 min | <1 min | K = 2 |
| Paths of movement for the vehicles within the lane | <10 min | <1 min | K = 5 |
| Traffic flow states | <10 min | <10 min | K = 10 |
| Weather, climate, light | <10 min | <10 min | K = 10 |
| Road condition, | <10 min | <10 min | K = 10 |
| Static signs, road markings | <1 h | <1 h | K = 20 |
| Road profiles, road names | >1 h | >1 h | K = 20 |

Two specific examples will be described below. The first example is a local hazard location, for example, a driver traveling the wrong way along a freeway.

At a time t0, the onboard sensor system identifies that a driver is traveling the wrong way along a freeway, for example, from the data captured by a front radar or a camera. Moreover, the average flow rate $v_{dF}$ (t) and the vehicle spacing $d_{dF}$ (t) are ascertained from the already observed vehicles at the time t0. The required time shift $t_v(a) = a \cdot d_{dF}(t)/v_{dF}(t)$ is therefore obtained as:

$$t_v(a) = a \cdot \frac{d_{dF}(t_0)}{v_{dF}(t_0)}.$$

Example: with an average flow rate $v_{dF}(t_0)=72$ km/h=20 m/s and an average vehicle spacing $d_{dF}(t_0)=60$m, a required time shift $t_v(a)=a\cdot 3$ sec is obtained.

A first random algorithm is used to determine the group Gx using the distribution of P. Example: the random number generated in the range 0.1 is 0.96, as a result of which the group G2 is selected. The group size is therefore 20 vehicles.

A second random algorithm is used to determine the shift within the group size. Example: the random number generated in the range 0.1 is 0.56, as a result of which the vehicle is shifted by 11 average vehicle time intervals. The identified hazard location is therefore sent with a delay of 33 seconds using an appropriate time stamp.

The second example considers the recognition of static signs and lane markings.

The onboard sensor system, for example, the front camera, recognizes various signs and lane markings over a distance of 2 km between the times t0 and t1.

Moreover, the average flow rate $v_{dF}(t)$ and the vehicle spacing $d_{dF}(t)$ are ascertained from the already observed vehicles at the time t0. The required time shift $t_v(a)=a\cdot d_{dF}(t)/V_{dF}(t)$ is therefore obtained as:

$$t_v(a) = a \cdot \frac{d_{dF}(t_0)}{v_{dF}(t_0)}.$$

Example: with an average flow rate $v_{dF}(t_0)=90$ km/h=25 m/s and an average vehicle spacing $d_{dF}(t_0)=100$ m, a required time shift $t_v(a)=a\cdot 4$ sec is obtained.

A first random algorithm is used to determine the group Gx using the distribution of P. Example: the random number generated in the range 0.1 is 0.52, as a result of which the group G1 is selected. The group size is therefore 20 vehicles.

A second random algorithm is used to determine the shift within the group size. Example: the random number generated in the range 0.1 is 0.34, as a result of which the vehicle is shifted by 6 average vehicle time intervals. The identified data are therefore sent with a delay of 30 seconds using an appropriate time stamp.

In the considerations above, it is assumed that all vehicles that are detected in the traffic can potentially participate in the data upload and are therefore a member of the anonymization group. However, this assumption is correct only if all of the already approved vehicles have been replaced by vehicles with the opportunity for data upload. To still arrive at the correct size of the anonymization group, it is therefore appropriate to expand the group by a correction factor kA in accordance with the group size. This correction factor is obtained from the proportion of the vehicles in the overall stock of vehicles that bring in data via the reception system.

LIST OF REFERENCE SYMBOLS

10 Receive a datum
11 Apply masking
12 Separate from other received data
13 Forward for evaluation
14 Receive a vehicle position
15 Compare the position with stored orders
16 Request a datum in the event of a match
20 Apparatus
21 Input
22 Data masking unit
23 Data separation unit
24 Data processing unit
25 Output
26 Memory
27 User interface
30 Apparatus
31 Memory
32 Processor
33 Input
34 Output
40 Motor vehicle
41 Reception system
42 Pseudonymization unit
43 Anonymization unit
44 Order memory
45 Backend
46 Vehicle sensors
47 Communication unit
48 Data adaptation unit
50 Personalized data
51 Anonymization parameter
52 Data pertaining to detected vehicles
53 Marginal parameter
54 Anonymized data

The invention claimed is:

1. A method for processing data captured by a transportation vehicle, the method comprising:
receiving a position of the transportation vehicle;
comparing the received position with one or more measurement orders stored in an order memory, the one or more measurement orders having been commissioned by a backend for defined positions;
requesting a datum from the transportation vehicle in response to the comparison determining that the position of the transportation vehicle fits one of the defined positions of one of the orders stored in the order memory;
receiving the datum captured by the transportation vehicle;
applying location-oriented or time-oriented masking to the received datum or separating the received datum from other data captured by the transportation vehicle; and
forwarding the masked or separated datum for evaluation,
wherein an extent of the location-oriented or time-oriented masking is determined based on data captured by the transportation vehicle pertaining to a flow of transportation vehicle traffic relevant to the received position or time of capture of the datum by the transportation vehicle, or the separating of the received datum from other data captured by the transportation vehicle is performed such that no further captured data are transmitted by this transportation vehicle for a predefined period of time, and
wherein the location-oriented or time-oriented masking or the separating of the received datum from other data captured by the transportation vehicle is performed inside the transportation vehicle.

2. The method of claim 1, wherein the degree of location-oriented or time-oriented masking is increased for a personal link of the received datum.

3. The method of claim 1, wherein determining the extent of the location-oriented or time-oriented masking involves taking a correction factor into consideration that is determined by the proportion of those transportation vehicles in the overall stock of vehicles that transmit data for processing.

4. The method of claim 1, wherein the degree of location-oriented or time-oriented masking is decreased for the flow of traffic relevant to the received position or time of capture of the datum by the transportation vehicle.

5. The method of claim 1, wherein the flow of traffic is determined by an onboard sensor system of the transportation vehicle.

6. The method of claim 1, wherein the location-oriented masking is performed by assigning the received datum to a raster.

7. The method of claim 1, wherein the time-oriented masking is performed by a random shift in the measurement time of the received datum.

8. The method of claim 7, wherein the random shift in the measurement time is based on an asymmetric distribution.

9. An apparatus for processing data captured by a transportation vehicle, the apparatus comprising:
   an input for receiving a position of the transportation vehicle;
   an order memory for comparing the received position with one or more measurement orders stored in the order memory, the one or more measurement orders having been commissioned by a backend for defined positions, and for requesting a datum from the transportation vehicle in response to the comparison determining that the position of the transportation vehicle fits one of the defined positions of one of the orders stored in the order memory;
   a data masking unit having a non-transitory computer readable medium with a stored program including program code that, when executed, applies location-oriented or time-oriented masking to the requested datum received by the input or a data separation unit having a non-transitory computer readable medium with a stored program including program code that, when executed, separates the requested datum received by the input from other data received from the transportation vehicle; and
   an output for forwarding the masked or separated datum for evaluation;
   wherein the data masking unit determines an extent of the location-oriented or time-oriented masking based on data captured by the transportation vehicle pertaining to a flow of transportation vehicle traffic relevant to the received position or time of capture of the datum by the transportation vehicle, or performs the separating of the requested datum received by the input from other data captured by the transportation vehicle such that no further captured data are transmitted by this transportation vehicle for a predefined period of time, and
   wherein the location-oriented or time-oriented masking or the separating of the received datum from other data captured by the transportation vehicle is performed inside the transportation vehicle.

10. A non-transitory computer-readable storage medium having instructions that, when executed by a computer, prompt the computer to carry out a method for processing data captured by a transportation vehicle, the method comprising:
    receiving a position of the transportation vehicle;
    comparing the received position with one or more measurement orders stored in an order memory, the one or more measurement orders having been commissioned by a backend for defined positions;
    requesting a datum from the transportation vehicle in response to the comparison determining that the position of the transportation vehicle fits one of the defined positions of one of the orders stored in the order memory;
    receiving the datum captured by the transportation vehicle;
    applying location-oriented or time-oriented masking to the received datum or separating the received datum from other data captured by the transportation vehicle; and
    forwarding the masked or separated datum for evaluation,
    wherein an extent of the location-oriented or time-oriented masking is determined based on data captured by the transportation vehicle pertaining to a flow of transportation vehicle traffic relevant to the received position or time of capture of the datum by the transportation vehicle, or the separating of the received datum from other data captured by the transportation vehicle is performed such that no further captured data are transmitted by this transportation vehicle for a predefined period of time.

11. The non-transitory computer-readable storage medium of claim 10, wherein, in the method, the degree of location-oriented or time-oriented masking is increased for a personal link of the received datum.

12. The non-transitory computer-readable storage medium of claim 10, wherein, in the method, determining the extent of the location-oriented or time-oriented masking involves taking a correction factor into consideration that is determined by the proportion of those transportation vehicles in the overall stock of vehicles that transmit data for processing.

13. The non-transitory computer-readable storage medium of claim 10, wherein, in the method, the degree of location-oriented or time-oriented masking is decreased for the flow of traffic relevant to the received position or time of capture of the datum by the transportation vehicle.

14. The non-transitory computer-readable storage medium of claim 10, wherein, in the method, the flow of traffic is determined by an onboard sensor system of the transportation vehicle.

15. The non-transitory computer-readable storage medium of claim 10, wherein, in the method, the location-oriented masking is performed by assigning the received datum to a raster.

16. The non-transitory computer-readable storage medium of claim 10, wherein, in the method, the time-oriented masking is performed by a random shift in the measurement time of the received datum.

17. The non-transitory computer-readable storage medium of claim 10, wherein, in the method, the random shift in the measurement time is based on an asymmetric distribution.

18. A transportation vehicle comprising an apparatus for processing data captured by the transportation vehicle, the apparatus comprising:
    an input for receiving a position of the transportation vehicle;
    an order memory for comparing the received position with one or more measurement orders stored in the order memory, the one or more measurement orders having been commissioned by a backend for defined positions, and for requesting a datum from the transportation vehicle in response to the comparison determining that the position of the transportation vehicle fits one of the defined positions of one of the orders stored in the order memory;

a data masking unit having a non-transitory computer readable medium with a stored program including program code that, when executed, applies location-oriented or time-oriented masking to the requested datum received by the input or a data separation unit having a non-transitory computer readable medium with a stored program including program code that, when executed, separates the requested datum received by the input from other data received from the transportation vehicle; and an output for forwarding the masked or separated datum for evaluation;

wherein the data masking unit determines an extent of the location-oriented or time-oriented masking based on data captured by the transportation vehicle pertaining to a flow of transportation vehicle traffic relevant to the received position or time of capture of the datum by the transportation vehicle, or performs the separating of the requested datum received by the input from other data captured by the transportation vehicle such that no further captured data are transmitted by this transportation vehicle for a predefined period of time, and wherein the location-oriented or time-oriented masking or the separating of the received datum from other data captured by the transportation vehicle is performed inside the transportation vehicle.

* * * * *